Patented Apr. 23, 1940

2,197,895

UNITED STATES PATENT OFFICE 2,197,895

ROOFING MATERIAL

Ernest H. Nichols, Hagerstown, Md.

No Drawing. Application August 27, 1936,
Serial No. 98,229

8 Claims. (Cl. 91—68)

This invention relates to new and useful improvements in that type of granular material which is largely used as a surfacing for asphalt roofing, whether in shingle, roll, or other form, for the purpose of imparting the desired color thereto and for protective purposes. In the manufacture of such roofing, it is customary to use granules of a particular color in order that the same may harmonize with a particular color scheme. For this reason, granules of various colors must be produced.

Generally speaking, these granules, known to the trade as "roofing granules" have been produced by crushing mineral matter in its natural state or otherwise so as to reduce the same to particles of the desired size or sizes and by then screening the crushed material so as to recover the said desired size or sizes from other sizes, after which the surfaces of the granules thus recovered have been given the desired color by any one of a number of different methods. Coloring methods that have been employed in the past have been objectionable for various reasons, however. For example, some have produced colors that were not permanent because of being superficially applied and, therefore, not weather resistant, also subject to wear during shipment and handling. To overcome this objection, roofing granules have been given a glassy or vitreous coating in which a coloring agent has been embedded. The manufacture of such granules is not only very costly but the coating is highly frangible as the result of which it has a tendency to chip off while the granules are in shipment and also while they are being handled by the roofing manufacturers. This chipping not only produces sharp razor-like edges on the granules, which are injurious to the hands and clothing of persons handling the roofing to which such granules have been applied, but the chipping also results in an excessive amount of fines which are not only too small for use as roofing granules but which greatly retard the proper adherence to the asphalt roofing of the granules in general. For this reason, it is frequently necessary for granules of this type to be re-screened after delivery to the roofing manufacturers, resulting in a loss of time and consequent expense. This re-screening does not, however, eliminate the highly objectionable sharp edges to which reference has been made.

Instead of applying the coating of colored glassy material to the granules, as just described, to obtain permanency of color, some have produced granules of the present type by first producing a vitreous product consisting of a combination of mineral substances and a suitable coloring agent which have all been fused into a dense vitreous mass of a glassy nature and by then crushing and screening this vitreous mass to obtain the desired sizes. Being vitreous or glassy, this mass, like the vitreous coating already mentioned, is exceedingly brittle so that the crushing operation produces on the resultant granules the same objectionable sharp razor-like edges to which reference has already been made. Roofing granules produced in this manner are also highly frangible so that, during shipment to the roofing manufacturer and during handling by him, particles are chipped therefrom, so that objectionable fines are produced which are not only unsuitable for use but retard adherence as already explained.

To insure color permanency, it is necessary for roofing granules to be colored with a non-fading coloring agent throughout their entire extent and not merely superficially coated therewith. It is also necessary that the material of which the granules are made be not too brittle so as to avoid, during the crushing operation, also during shipment and handling, the production of excessive fines and the formation of the sharp edges already mentioned.

A further disadvantage common to roofing granules having the smooth glassy surfaces that result from complete vitrification is that, because of these glassy surfaces, they do not properly adhere to the asphalt surface of the roofing in connection with which they are employed.

With the foregoing in view, an object of the present invention is to produce granular material of the type mentioned which shall be of weather resisting color throughout.

Another object is to provide a base material to be crushed into granules of a given size or sizes, which shall not have been completely vitrified and, therefore, not so brittle as to produce, either during the crushing operation or during subsequent handling, an excessive amount of fines nor to produce sharp edges on the finished granules.

A further object is to provide roofing granules which will properly adhere to the asphalt surface of bituminous roofing, a characteristic which is decidedly lacking in the vitreous granules and vitreous coated granules already mentioned.

A still further object is to provide a base material to be crushed into granules, which base material shall be formed into such shapes as will facilitate the crushing operation.

With the foregoing and other objects in view, I produce granules according to my invention, broadly speaking, by first producing dense and substantially non-absorbent semi-vitreous material of a stony character, to which material I will hereinafter refer as the "base," by sintering together fine particles of suitable mineral substances, with or without the coloring agent, which semi-vitreous base is then crushed and screened to proper size. The term "semi-vitreous" does not mean that the composition has become a glass, but only that it contains enough of a glassy matrix to fill the interspaces between the mineral particles with fused material to a sufficient degree to cause the resultant base to be dense, substantially non-absorbent, and of a stony character.

In preparing the base to which I have just referred, I select certain highly siliceous minerals such as quartz, quartzite, feldspar, shale, slate, clay, epidote, greenstone, etc., two or three of such substances being sufficient as a general rule, although I may use any number desired. One or more of the mineral substances selected should preferably be fusible and borax, or other suitable flux, should also be included. Clay, or other mineral equivalent, to produce a plastic mass may also be used. At times, minerals may be selected which, when ground, mixed together, and fired will produce a base having the color desired for the finished granule, but it is generally necessary to add a suitable coloring agent to the mix in order to obtain the desired colors and shade. When this condition obtains, it is well to select, for forming the base, mineral matter having a minimum amount of color, or having a color which, when burned, will approach that desired for the finished product, as nearly as possible.

The mineral matter selected, with or without a coloring agent, is first delivered to a suitable pulverizing mill where it is also thoroughly mixed. When the material has been properly crushed, mixed and screened, an amount of water is added to produce a stiff plastic mass. It is important to use such an amount of water as to properly control the plasticity of the mass and, when color oxide is used, to suit the particular type employed.

I have found, in practice, that the following dry material, used in the proportions stated, give satisfactory results when used as a batch or mix for producing a green base to be crushed and screened, it being understood that the amount of color oxide will depend upon the colors of the remaining portions of the mix:

|  | Pounds |
|---|---|
| Quartz | 1300 |
| Borax | 40 |
| Clay | 500 |
| Feldspar | 200 |
| Chromium oxide | 16 |

It will be understood that the proportions given may be somewhat varied to obtain best results, and that substitutes for these materials may be employed. The quartz, which may be in the form of rock or sand, is used to produce a refractory structure, also for sintering the other ingredients together during the firing process to be explained later therein. The borax is used as a flux and the clay is used to impart plasticity to the entire mix and to hold the other ingredients together until fired. The clay employed may be natural clay, brick clay, kaolin, or any similar mineral substance that will impart to the entire mix the proper degree of plasticity. The feldspar is used to impart a proper degree of hardness and insolubility to the finished granules and the chromium oxide is for coloring, as will be understood. If other ingredients are employed, care must be taken to select those having the same stated characteristics as those given in the foregoing formula.

After the ingredients have been properly ground and mixed together, they are transferred, in any suitable manner, to a pug mill such as is used in the manufacture of bricks, where a suitable amount of water is added to obtain the consistency already described. With the formula given above, this should be about 40 gallons. The plastic mass thus produced is then transferred to an auger or extruding device from which it is forced through a suitable forming die. I have found that a die having a circular passage of about one-half (½) an inch in diameter therethrough is satisfactory, as this will cause the plastic material to issue from the extruder in cylindrical form and of a convenient size. Other forming dies may be used, but care should be exercised to select one which will cause the plastic material to assume a size which, when broken into sections, may be readily fired.

As the cylindrical column of plastic material issues horizontally from the die of the extruding device, it breaks, because of gravity, into relatively short sections which fall onto a conveyor belt placed slightly beneath said die, and are thus carried to a suitable kiln, preferably one of the rotary type, where they are fired at a temperature sufficiently high and for a sufficient length of time to cause semi-vitrification only. That is to say, they are fired in such a manner as to cause a sintering together of the mineral particles of which the plastic sections or shapes are formed, but not in a manner to reduce the shapes to a molten state, nor even to deform them. The temperature and time of firing must, in fact, be only sufficient to burn the sections to a dense compact mass. For the formula given herein, this temperature should be approximately 2000° F., and the firing should be continued for about 30 minutes.

When the sections of the base have been properly burned, they pass from the kiln into a suitable cooler and, when cooled, they are crushed and screened to proper size according to the use for which they are intended. For use as roofing granules, they should be crushed and screened to pass an 8 or 10 mesh screen and be retained on a 35 mesh screen. Particles too fine for use may, of course, be used for making a subsequent batch for producing the base. Oversized particles are returned to the crusher.

In order that the plastic sections of the base may become partially dehydrated and hardened before they enter the kiln, so as not to become deformed therein before they are completely burned, the conveyor belt may pass through a zone of heat taken from the kiln or from any other source.

A particular advantage arising from my invention is that granules may be produced in accordance therewith in most any locality because they may be made of materials that are to be had in practically any part of the country. For this reason, great savings may be effected in the cost of shipping.

Attention is also called to the fact that the crushing of the base material, due to the fact that it is only semi-vitreous, will produce granules having rough or granular faces, thus assuring their proper adherence to the asphalt of the roofing in connection with which they are used. While the material described herein has been mentioned as being particularly adapted for use in connection with the manufacture of bituminous roofing, it is to be understood that it may be used for many other architectural purposes, and in other ways.

This application is based upon my application filed February 5, 1936, Serial No. 62,549, in which the invention claimed herein is disclosed, and which has matured into United States Patent No. 2,046,295, dated June 30, 1936.

What is claimed is:

1. A composite sheet body for roofing or like purposes comprising a plastic stratum and an adherent surfacing for same consisting of granular material the individual granules of which are characterized by having a dense body consisting throughout of particles of siliceous mineral matter held together by a partly vitrified matrix, said matrix filling the interspaces between said particles.

2. A composite sheet body for roofing or like purposes comprising a plastic stratum and an adherent surfacing for same consisting of granular material the individual granules of which are characterized by having a dense body consisting throughout of particles of siliceous mineral matter held together by a partly vitrified matrix, said matrix including a coloring agent and filling the interspaces between said particles.

3. A composite sheet body for roofing or like purposes, comprising a plastic stratum and an adherent surfacing for same consisting of granular material the individual granules of which are characterized by having a dense body consisting throughout of particles of siliceous mineral matter held together by a partly vitrified matrix comprising clay and a flux, said matrix filling the interspaces between said particles.

4. A composite sheet body for roofing or like purposes, comprising a plastic stratum and an adherent surfacing for same consisting of granular material the individual granules of which are characterized by having a dense body consisting throughout of particles of siliceous mineral matter held together by a partly vitrified matrix comprising clay and a flux, said matrix filling the interspaces between said particles, and said individual granules having granular faces.

5. A composite sheet body for roofing or like purposes, comprising a plastic stratum and an adherent surfacing for same consisting of granular material the individual granules of which are characterized by having a dense body consisting throughout of particles of siliceous mineral matter held together by a partly vitrified matrix comprising clay, a flux, and a coloring agent, said matrix filling the interspaces between said particles, and said individual granules having granular faces.

6. A composite sheet body for roofing or like purposes, comprising a plastic stratum and an adherent surfacing for same consisting of granular material the individual granules of which are characterized by having a dense body consisting throughout of particles of siliceous mineral matter held together by a partly vitrified matrix comprising clay, feldspar, and a flux, said matrix filling the interspaces between said particles.

7. A composite sheet body for roofing or like purposes comprising a plastic stratum and an adherent surfacing for same consisting of granular material the individual granules of which are characterized by having a dense body consisting throughout of particles of siliceous mineral matter held together by a partly vitrified matrix, said matrix filling the interspaces between said particles, and each of said individual granules comprising approximately 24% of clay and 63% of quartz mineral.

8. A composite sheet body for roofing or like purposes comprising a plastic stratum and an adherent surfacing for same consisting of granular material the individual granules of which are characterized by having a dense body consisting throughout of particles of siliceous mineral matter held together by a partly vitrified matrix, said matrix filling the interspaces between said particles, and each of said individual granules comprising approximately 24% of clay, 63% of quartz, 2% of borax, and 10% of feldspar.

ERNEST H. NICHOLS.